| United States Patent [19] | [11] Patent Number: 4,813,410 |
| Kruse et al. | [45] Date of Patent: Mar. 21, 1989 |

[54] GAS MASK FILTER FOR THE REMOVAL OF LOW LEVEL ETHYLENE OXIDE CONTAMINANTS FROM AIR COMPRISING DRIED CATIONIC EXCHANGE RESINS

[75] Inventors: Richard J. Kruse, Flushing; David E. Hammer, Ann Arbor, both of Mich.

[73] Assignee: Advanced Air Technologies, Inc., Owosso, Mich.

[21] Appl. No.: 50,468

[22] Filed: May 18, 1987

[51] Int. Cl.$^4$ .............................................. A62B 18/00
[52] U.S. Cl. ................................. 128/205.27; 55/522; 423/245.1
[58] Field of Search ..................... 128/205.27; 55/522, 55/524, 528; 422/30; 423/245

[56] References Cited

U.S. PATENT DOCUMENTS

| 3,851,043 | 11/1974 | Gunther | 422/30 X |
| 4,365,071 | 12/1982 | Yamanes | . |
| 4,383,956 | 5/1983 | Croft | 55/524 |
| 4,423,005 | 12/1983 | Murtaugh | 422/61 |
| 4,572,178 | 2/1986 | Takase | 128/205.27 |

*Primary Examiner*—Alan Cohan
*Attorney, Agent, or Firm*—Peter J. Georges

[57] ABSTRACT

A gas mask filter material is described comprising a dried acidic ion exchange resin which is effective in removing low levels of ethylene oxide from air contaminated therewith. Specifically described is a gas mask filter comprising a cross-linked polystyrene resin with sulfonic acid functionality that contains less than about 20 percent by weight water.

6 Claims, No Drawings

GAS MASK FILTER FOR THE REMOVAL OF LOW LEVEL ETHYLENE OXIDE CONTAMINANTS FROM AIR COMPRISING DRIED CATIONIC EXCHANGE RESINS

BACKGROUND OF THE INVENTION

This invention relates generally to a gas mask filter and method of using same or remove low levels of ethylene oxide from ethylene oxide contaminated air. The filter comprises dried ion exchange resin. At anticipated conditions of gas mask/face mask use, upon contact of ethylene oxide therewith, the resin catalyzes polymerization of the ethylene oxide at a rapid rate. Resulting polymer reaction products are tenaciously retained on the resin surface.

The wearing of protective face masks to filter out noxious gases has been a common industrial practice for a long time. For this purpose, filters comprising a wide range of absorbents/adsorbents and a variety of alternative structures have been used. To date, the only gas masks commercially available for general personnel protection from ethylene oxide inhalation have been based upon activated carbon media, often chemically treated (e.g., Mine Safety Appliances, Model GMEO-SSW).

Removal of ethylene oxide from air is industrially important to maintain environmental quality and to protect workers' health. Various designs for scrubbers are commercially available, all working on the same principle: The gas mixture, containing traces of ethylene oxide, is contacted with water. The water contains a dissolved catalyst, typically a strong acid such as sulfuric acid, or a strong base. This catalyst promotes the reaction of ethylene oxide with water (hydrolysis) to form ethylene glycol, which is a relatively innocuous and non-volatile compound. This scrubbing liquor is reused until the process efficiency decreases beyong an acceptable limit, due to the accumulation of ethylene glycol; at this point, the pH of the liquor must be adjusted (neutralized) before disposal.

While acid scrubbers perform adequately for process streams with moderate levels of ethylene oxide in air, reduction of ethylene oxide concentrations below a few parts-per-million is generally impractical. Likewise, room air cleaning, which involves larger air volumes and lower concentrations of ethylene oxide, cannot be performed with wet scrubbing unless prohibitively large water flow rates and huge equipment are employed.

The other systems currently available for ethylene oxide removal are based upon adsorption on activated carbon. Activated carbons have much lower capacity for ethylene oxide retention, when compared to the ion exchange resins described herein. Smaller device sizes can therefore be envisioned. Moreover, because ethylene oxide is retained on activated charcoal by comparatively weak retention forces of absorbtion, desorption may occur and the effectiveness of removal can vary unacceptably over time and under various conditions.

Ethylene oxide contaminant removal, at high levels, such as found in sterilizer effluents using exchange resins, is taught in U.S. Pat. No. 3,851,043, which discloses a system and method for the removal of ethylene oxide contaminants using gel-type ion exchange resins. In accordance with the method of U.S. Pat. No. 3,851,043, the presence of water is required. water is present in such an amount that ethylene oxide is reacted with the resin at a liquid solid interface; that is the reaction is effected in a liquid phase.

Ion exchange resins have also been used in methods of 1,4-Dioxane synthesis (See e.g. U.S. Pat. No. 4,355,071 and German Pat. No. 2,430,355) wherein an ethylene oxide stream is reacted with the resin to form an intermediate product. In such processes, once again, the intermediate reaction involving the resin and ethylene oxide is effected in liquid phase.

Specifically, acidic sulfonated polystyrene resins have been used in the prior art to catalyze the formation of a liquid ethylene oxide product (ethylene glycol and polyglycol liquids) in the presence of water in order to quantitatively measure ethylene oxide exposure. (U.S. Pat. No. 4,423,005)

The art also teaches the use of ion exchange resins as catalysts in the high temperature gas-phase reactions of ethylene-oxide to form ethylene glycol.

The present invention is based on the discovery that low level ethylene oxide contaminants can be removed from air by use of a filter comprising dried acidic ion exchange resins. The resin in the filter contains less than about 20% by wt. water. Reaction of ethylene oxide upon contact with the resin occurs substantially at a gas-solid reaction interface. Solid ethylene oxide polymer is rapidly formed and bound to the resin. The strength of the forces of attraction between polymer and resin are of such magnitude that retention continues after the ethylene oxide has been removed from the air, and during the period after contaminant removal when uncontaminated air continues to be passed through the resin. In accordance with this invention, permanent retention of polymer persists at conditions of use. Detrimental ethylene oxide-containing gaseous components are not "washed-out" of the resin during continuous use of the gas mask when ethylene oxide-free air passes through the mask.

It is notable that, in contrast to U.S. Pat. No. 4,423,005, this invention enlists ion exchange resins in systems where ethylene oxide and water concentrations are must more dilute than those encountered in sterilizer operations. In this regime, reaction products are formed which are largely bound to the resin, and water behaves as a rate inhibitor.

Much of the prior art described above depends upon ion exchange resins to catalize reactions of ethylene oxide. In the present invention, ion exchange resins are employed, to a large extent, as solid phase reactants.

DESCRIPTION OF THE INVENTION AND PREFERRED EMBODIMENTS

In accordance with the present invention a face mask/gas mask filter is provided that is comprised of a solid, cationic ion exchange resin in acid (hydrogen) form that contains less than about 20% by wt. water.

The present invention requires that the resin used in the filter element has a water content of less than about 20% by wt. based on total weight of resin and water. The water content of the resin (in dried state, the resins useful in the present invention contain at least about 15% by wt. water based on the total weight of resin and water.) must be maintained at a level that does not interfere with the required two-phase, gas-solid interface reaction conditions. Acceptable water contents for the resin vary, based upon other reaction parameters, but as heretofore noted maintaining a dry resin condition wherein the water content of the resin is about 20% by weight or less is required to assure proper performance of the resin in a gas mask.

Resins in the wet state (50% by wt. water) are unsuitable for the present invention and although moderate levels of water content can be tolerated—though, not necessarily with equivalent results—it is critical that the level of the moisture in the gas being treated and the water content of the resin are such that the reaction of ethylene oxide contaminant and resin substantially occurs at a gas-solid interface.

It is critical that substantially all of the ethylene oxide (to less than 0.5 PPM) is removed. For this purpose, it is necessary that substantially all of the ethylene oxide reaction products are generated by reaction at the gas-solid interface of resin and contaminated gas. This is important because the rate of reaction achieved at such conditions is markedly more rapid than at conditions allowing for high levels of hydrolysis and/or a liquid-solid interface reaction environment. It has been observed that gas mask usage would occur generally at conditions at which workers operate in ethylene oxide polluted environments with temperatures normally being 75° F.±40° F. and humidity levels normally falling below about 50% Relative Humidity. (Relative Humidity levels above about 85% cannot be tolerated.) At such conditions, contrary to what is suggested by the prior art, as the level of water content in the resin and/or gas increases, the rate of reaction diminishes. Although not wishing to be bound, it is believed that at conditions promoting high levels of gas-liquid interface reaction of ethylene oxide, the rate of reaction is enhanced and the product composition is such, that even at low levels of contamination, (1) the probability of ethylene oxide reaction, upon contact with the resin, is maximized and (2) the solid product formed by catalysis at a gas-solid interface is retained on the resin surface more strongly than gas and/or hydrolysis products formed by the methods of the prior art.

In accordance with the present invention, the contact between resin and contaminated gas can be achieved using any of the well known gas mask filter element structures and this feature forms no part of the present invention, The ethylene oxide removal capacity is about 1 lb. of ethylene oxide/1 lb. of resin. The means of effecting intimate contact between solid and gaseous reactants by alternative geometric particle shapes (spheres, cylinders, etc.) is well known to the art and such choices as made to effect contact forms no part of the present invention.

The air being filtered generally will contact less than about 1%, by volume, ethylene oxide. Relative humidity above about 85% cannot be tolerated, except for periods of very short duration. The resin suitable for the invention must be a strong-acid, cationic, macroporous of macroreticular ion exchange acid-form resin; preferably a cross-linked polystyrene resin with sulfonic acid functionality.

The following example will further illustrate the present invention:

EXAMPLE

A filter element of dry Dowex M-31 brand resin (Dow Chemical Company), measuring 1 inch thick and with a cross-section for flow of 0.3 square feet, is used in simulated gas mask use conditions. This resin has nominally spherical particles, with less than 8% larger than 16 mesh and less than 5% smaller than 40 mesh (screen size). Approximate dry resin density is 40 pounds per cubic foot. The air to be treated is at 75 degrees F., has a Relative Humidity of 15%, and contains 1000 parts per million ethylene oxide (by volume).

This contaminated air is inhaled through the filter bed at an average rate of 2.65 cubic feet per minute. The concentration of ethylene oxide in the air leaving the filter bed will be less than 1 part per billion for 14 hours, at which point the concentration in the effluent will begin to build. After about 31 hours, the filter's capacity for ethylene oxide will be completely exhausted.

For the treatment with Dowex M-31, operating at temperatures near 75° F., a relative humidity less than approximately 50% provides optimal reaction conditions with best results observed as the level of relative humidity is lowered; a relative humidity range of approximately 50 to 85% provides sub-optimal performance; a relative humidity greater than about 85% is unsatisfactory.

The detailed description set forth is the preferred embodiment of the method of the present invention. However, certain changes may be made in carrying out the above method without departing from the scope of the invention; it is therefore intended that all matter contained in the above description shall be interpreted as illustrative and not in a limited sense. It is also to be understood that the following claims are intended to cover all of the generic and specific features of the invention herein described, and all statements of the scope of the invention, which as a matter of language, might be said to fall therebetween.

We claim:

1. A gas mask filter comprising an acidic ion exchange resin containing less than about 20 percent by weight water which, upon contact with ethylene oxide, catalyzes polymerization of the ethylene oxide to yield a solid polymer that is retained on the surface of the resin.

2. The gas mask filter of claim 1, wherein the resin is a strong-acid cationic, maroporous or macroreticular ion exchange acid-form resin.

3. The gas mask filter of claim 2, wherein the resin is a cross-linked polystyrene resin with sulfonic acid functionality.

4. The gas mask filter of claim 2, wherein the resin is macroporous.

5. The gas mask filter of claim 3, wherein the resin is macroporous.

6. A gas mask filter comprising a macroporous cross-linked polystyrene resin with sulfonic acid functionality containing from about 20 to about 15 percent by weight water.

* * * * *